US009007457B2

(12) United States Patent
Levesque

(10) Patent No.: US 9,007,457 B2
(45) Date of Patent: Apr. 14, 2015

(54) ACQUISITION OF 3D TOPOGRAPHIC IMAGES OF TOOL MARKS USING NON-LINEAR PHOTOMETRIC STEREO METHOD

(75) Inventor: Serge Levesque, Montreal (CA)

(73) Assignee: Ultra Electronics Forensic Technology Inc., Cote-Saint-Luc, Quebec (CA)

( * ) Notice: Subject to any disclaimer, the term of this patent is extended or adjusted under 35 U.S.C. 154(b) by 681 days.

(21) Appl. No.: 13/151,538

(22) Filed: Jun. 2, 2011

(65) Prior Publication Data

US 2011/0311107 A1  Dec. 22, 2011

Related U.S. Application Data

(60) Provisional application No. 61/355,241, filed on Jun. 16, 2010.

(51) Int. Cl.
*H04N 7/18* (2006.01)
*G06K 9/00* (2006.01)
*G06T 7/00* (2006.01)

(52) U.S. Cl.
CPC ..... *G06T 7/0073* (2013.01); *G06T 2207/10152* (2013.01); *G06T 2207/30136* (2013.01)

(58) Field of Classification Search
CPC ... A24C 5/3412; B61L 23/044; B61L 23/047; B61L 23/048; G01B 11/024
See application file for complete search history.

(56) References Cited

U.S. PATENT DOCUMENTS

| 5,001,344 | A | * | 3/1991 | Kato et al. ................. 250/307 |
| 5,659,671 | A | | 8/1997 | Tannenbaum et al. |
| 5,838,428 | A | * | 11/1998 | Pipitone et al. ............. 356/3.09 |
| 6,166,393 | A | | 12/2000 | Paul et al. |
| 6,410,872 | B2 | | 6/2002 | Campbell et al. |
| 7,379,618 | B2 | | 5/2008 | Motomura et al. |
| 2006/0103724 | A1 | * | 5/2006 | Jongsma et al. ............ 348/78 |
| 2006/0274921 | A1 | | 12/2006 | Rowe |
| 2007/0098288 | A1 | | 5/2007 | Raskar et al. |
| 2008/0186390 | A1 | | 8/2008 | Sato et al. |
| 2009/0116697 | A1 | * | 5/2009 | Shalaby et al. ............ 382/108 |
| 2009/0284756 | A1 | * | 11/2009 | Roberge et al. ............ 356/601 |
| 2010/0039427 | A1 | * | 2/2010 | Yun, II ...................... 345/419 |
| 2010/0142804 | A1 | | 6/2010 | Mallick et al. |
| 2011/0085326 | A1 | * | 4/2011 | Jouffrieau .................. 362/232 |

OTHER PUBLICATIONS

International Search Report dated Sep. 7, 2011 issued by the International Bureau (WIPO) in connection with the corresponding International patent application No. PCT/CA2011/050335.

Georghiades, Athinodoros S., "Recovering 3-D Shape and Reflectance From a Small Number of Photographs", Department of Electrical Engineering, Yale University, New Haven, CT 06520, U.S.A., Eurographics Symposium on Rendering 2003, pp. 230-315.

(Continued)

*Primary Examiner* — Dave Czekaj
*Assistant Examiner* — Nam Pham
(74) *Attorney, Agent, or Firm* — Norton Rose Fulbright Canada LLP

(57) ABSTRACT

There is described a method and 3D image acquisition system for addressing the specular nature of metallic surfaces in general, and ballistic pieces of evidence in particular, using photometric stereo by identifying and solving a plurality of sets of non-linear equations comprising a diffusive term and a specular term to determine a surface normal vector field N(x, y), and using N(x,y) to determine a 3D topography Z(x,y).

18 Claims, 8 Drawing Sheets

(56) References Cited

OTHER PUBLICATIONS

Ruggero Pintus, "Advances in Photometric Stereo", Feb. 27, 2007, retrieved from [http://www.diee.unica.it/driei/tesi/19_pintus.pdf].

Alexander Toet, "Multi-scale contrast enhancement with applications to image fusion", Society of Photo-Optical Instrumentation Engineers, May 1992.

* cited by examiner

ACQUISITION OF 3D TOPOGRAPHIC IMAGES OF TOOL MARKS USING NON-LINEAR PHOTOMETRIC STEREO METHOD

CROSS-REFERENCE TO RELATED APPLICATIONS

This application claims priority under 35 U.S.C. §119(e) from U.S. Provisional Patent Application No. 61/355,241, filed on Jun. 16, 2010, the contents of which are hereby incorporated by reference.

TECHNICAL FIELD

The present invention relates to the field of the acquisition of topographic images of highly specular objects using non-linear photometric stereo methods.

BACKGROUND OF THE ART

Ballistic comparison tests rely on the striations and impressions that are created on the surface of a ballistic piece of evidence (BPOE) such as a bullet or cartridge case. These striations have unique features that represent a unique signature of a firearm. By comparing the striations or impressed characteristics of two BPOE, it may be possible to conclude if they have been fired from the same firearm.

When acquiring 3D topography images of an area on an object, i.e. a relief map $Z(x, y)$ where Z is the local height of the surface at position $(x, y)$, an optical system including a sensor (or camera) and a light source is used. An object under study is illuminated and a topographic image of the illuminated surface is acquired.

In the field of ballistics, objects under study are often non-planar and likely specular. This means that most of the incident light from an angle $\theta$ with respect to the local surface normal N will be reflected in a small cone pointing in the direction $-\theta$. Therefore, if the light source is placed along the optical axis of the sensor, as it is the case for numerous optical methods for topography capture, only an infinitesimal part of incident light is reflected back into the sensor for portions of the topography showing significant slopes, leading to locally invalid measurements.

A totally different method of measuring the topography of an object exists. According to the method, known as photometric stereo, a set of radiance (or energetic luminance) images of the surface are acquired, with different lighting conditions for each image of the set. If a constant reflectivity of the surface and identical illumination strength of the light sources are assumed and if the surface is purely diffusive (or Lambertian), three light sources are sufficient to retrieve the surface normal field $N(x,y)$. The topography $Z(x,y)$ of the surface is obtained through integration of the normal field.

However, radiance images of a surface are subjected to noise and the surface reflectivity might not be constant due to local variation of color and/or albedo. A common solution is to use a greater number of light sources in order to over define the linear system of equations. The surface normal field $N(x, y)$ is then obtained though an error minimization procedure such as the chi square error minimization scheme. If the number of light sources is large enough, one can even afford not to measure the intensity of the light sources, or even the light source positions, and obtain this information through a fitting procedure, Principal Component analysis, or other methods known to those skilled in the art.

Very few surfaces are truly diffusive and applying the aforementioned procedure leads to very poor results in terms of accuracy of the topography if the surface is glossy or shiny. However, when the viewing direction is far from the specular reflection direction for a particular light source, the Lambert model of light reflection on a surface might still hold to a certain extent. Again, the common solution when facing such a shiny or glossy material is to over define the problem by using more than three light sources and determine, for every pixel of the resulting image set, if any light source produces a reflection toward the camera that is dominated by non Lambertian contribution. If such a condition is found, the contribution of this light source is ignored in the computation of the surface normal N of the considered pixel.

However, when considering ballistic pieces of evidence (BPOE), none of these methods work since the surface is metallic, which leads to a diffusive contribution of light reflection, if any, that is orders of magnitude lower than the specular contribution. There is therefore a need to improve photometric stereo for the capture of metallic surfaces in general and for BPOE's in particular.

SUMMARY

There is described herein a method and 3D image acquisition system for addressing the specular nature of metallic surfaces in general, and ballistic pieces of evidence in particular, using photometric stereo by identifying and solving a plurality of sets of non-linear equations comprising a diffusive term and a specular term to determine a surface normal vector field $N(x,y)$, and using $N(x,y)$ to determine a 3D topography $Z(x,y)$.

In accordance with a first broad aspect, there is provided a method for determining a 3D topography $Z(x,y)$ of a specular surface of an object, the method comprising: successively illuminating the surface of the object from a plurality of localized axis directions; acquiring at least one image of the surface of the object at each successive illumination of the surface of the object using a sensor having a sensing axis substantially perpendicular to a general plane of the surface of the object, thereby resulting in a set of radiance images having a same field of view (FOV); using the radiance images to provide and solve a plurality of sets of non-linear equations comprising a diffusive term and a specular term to determine a surface normal vector field $N(x,y)$; and determining the 3D topography $Z(x,y)$ using the surface normal vector field $N(x, y)$.

In accordance with a second broad aspect, there is provided a system for determining a 3D topography $Z(x,y)$ of a specular surface of an object, the system comprising: a sensor for acquiring 2D radiance images, the sensor having a sensing axis substantially perpendicular to an overall plane of the object; a set of K effective light sources provided at a plurality of localized axis directions; and a computer readable medium having program code stored thereon and executable by a processor for: causing the K effective light sources to successively illuminate the surface of the object from the plurality of localized axis directions; causing the sensor to acquire at least one image of the surface of the object at each successive illumination of the surface of the object, thereby resulting in a set of radiance images having a same field of view (FOV); using the radiance images to provide and solve a plurality of sets of non-linear equations comprising a diffusive term and a specular term to determine a surface normal vector field $N(x, y)$; and determining the 3D topography $Z(x,y)$ using the surface normal vector field $N(x,y)$.

In accordance with another broad aspect, there is provided a computer readable medium having encoded thereon: program code of a light control module executable by a processor to cause K effective light sources to successively illuminate a surface of an object from a plurality of localized axis directions; program code of a sensor control module executable by a processor to cause a sensor to acquire at least one image of the surface of the object at each successive illumination of the surface for the object, thereby resulting in a set of radiance images having a same field of view (FOV); and program code of a topography generating module executable by a processor to use the radiance images to provide and solve a plurality of sets of non-linear equations comprising a diffusive term and a specular term to determine a surface normal vector field $N(x, y)$, and the 3D topography $Z(x,y)$ using the surface normal vector field $N(x,y)$.

In this specification, the term "3D topography" is intended to mean a relief surface $Z(x, y)$ where Z is the local height of the surface at the position $(x, y)$ relative to the sensor axis in a plane perpendicular to the sensor axis. The expressions "2D radiance image" should be understood as the map $R(x,y)$ of the radiance (or energetic luminance) captured by an optical camera. It is directly proportional to a map of the light intensity emitted by the surface in the direction of the camera. This is called, in common language, a photographic image. Throughout this text, it is understood that the radiance images are single channel, or monochromatic. Therefore, no color information is recorded and bit depth of images refers to the bit depth of the single channel. A monochromatic image obtained from a color camera, either by combining information from different color channels or by considering only one such channel, can also be used. It is also understood that the camera has a linear radiometric response, or otherwise that the radiometric response of the camera is known so that the captured image can be linearized. The expression "effective light sources" should be understood to include both a total number of physical light sources and an effective total number of lights sources used when successive rotations of physical light sources and/or an object under observation are applied.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Some of the objects showing tool mark features are not flat. Spent cartridge cases, for instance, show a large and deep depression in the central part of the primer (for central fire calibers) or in the outer region of a cartridge head (for rim fire calibers). This depression is usually orders of magnitude deeper than the usual depth of striations or impression marks useful for ballistic identification. Many spent cartridge cases of center fire calibers also show regions stretching over the general plane of the primer. These regions are known as flow back and often show firearm characteristic striations of shear marks on their outer boundary. Furthermore, since bullets are roughly cylindrical objects, the local value of their surface normal varies continuously in a direction perpendicular to a cylindrical axis.

Even if an image sensor is placed over the object under study with its optical axis (or sensor axis) roughly perpendicular to the overall plane of the object and with a coaxial light source, it may happen that relevant ballistic marks lie on local surface areas that are far from being perpendicular to the optical axis. If the material of the object under study is highly specular (that is, it reflects most of the incoming light as a mirror would, with equal incident and reflected angles) as it is with metals in general and ballistic pieces of evidence (BPOE) in particular, very little of the incident light shining these locally steep regions will be reflected back to the sensor, resulting in an invalid topographic measurement.

Figure 1:
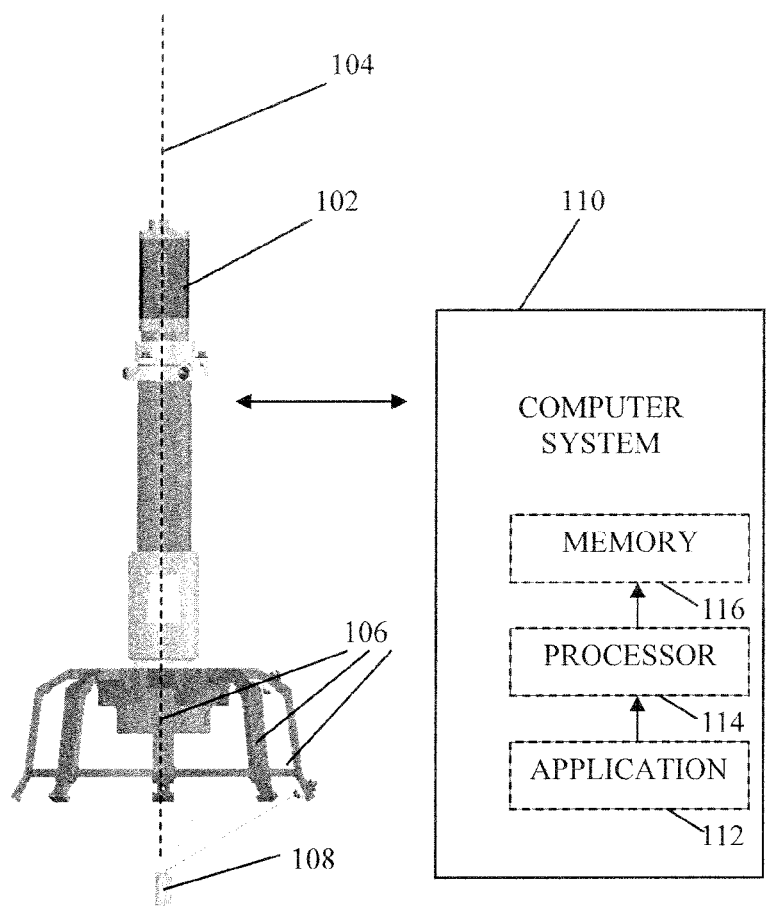
FIG. 1 illustrates an exemplary embodiment of a system used to acquire 3D topographies using a non-linear photometric stereo method.

FIG. 1 illustrates an exemplary embodiment of a system used to acquire 3D topographies using a non-linear photometric stereo method. The system consists generally of a sensor 102 and a set of K localized light sources 106. As shown, the image capturing device 102 and the lighting apparatus 106 are separated, but one of the light source axes may be collinear with the sensor axis. In this configuration, the image capturing device 102 is placed over the object under study 108 with its optical (or sensing) axis 104 roughly perpendicular to the overall plane of the object 108. In the present example, a coordinate system having a Z axis which corresponds to the optical axis 104 of the sensor 102 is used. The X and Y axes are a pair of mutually orthogonal axes that define the plane perpendicular to the Z axis. The positions on the object's surface and on the captured images are equally denoted $(x,y)$ and shall indistinctly describe the physical point and the mapped point on the image. Other coordinate systems might be used without affecting the generality of this method.

The object is illuminated from multiple localized axis directions 106. Furthermore, those localized light sources 106 illuminate one at a time and at least one radiance image is captured by the optical sensor 102 for each light source 106 of the set. A computer system 110, having a processor 114, and application 112 and a memory 116, is operatively connected to the sensor 102 and light sources 106 for control and processing operations. The application 112 comprises program code that is executable by the processor 114, as will be described in more detail below.

Figure 2:
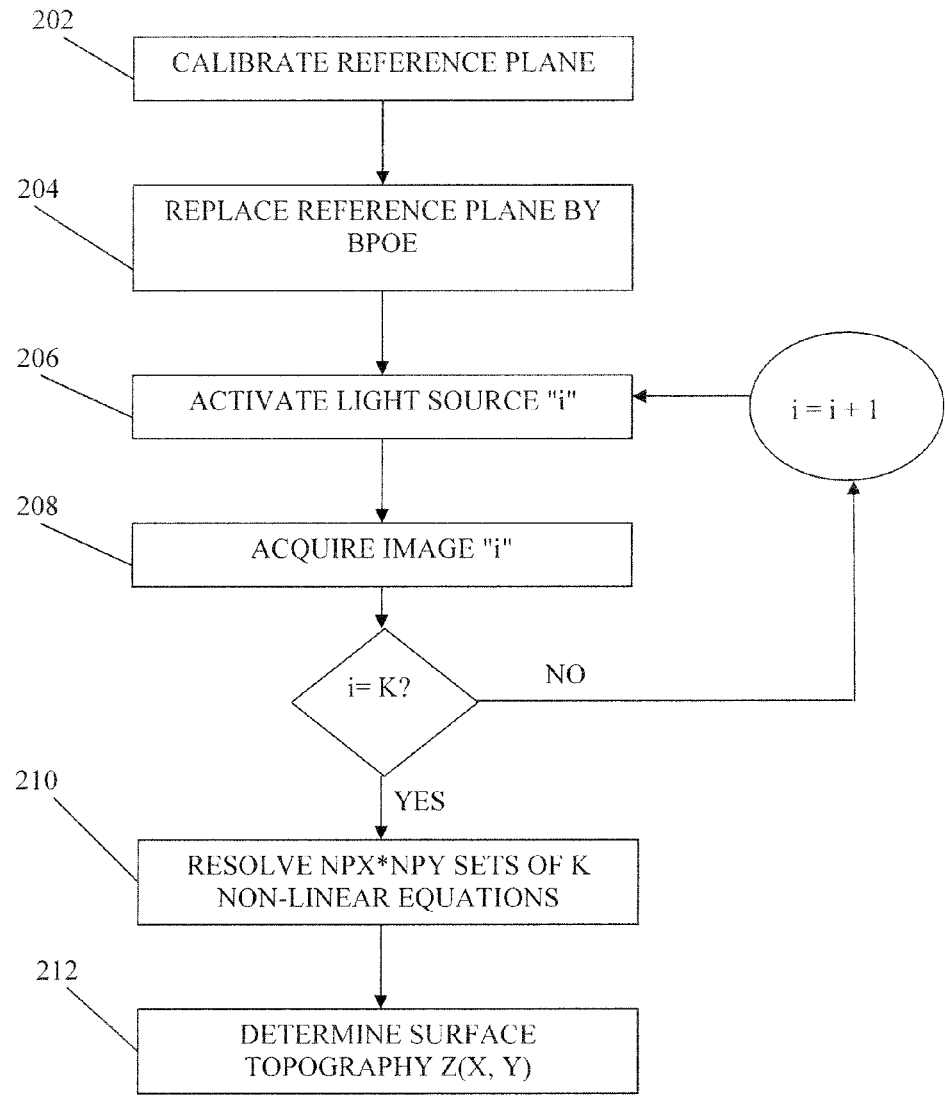
FIG. 2 is a flowchart illustrating an exemplary embodiment of a non-linear photometric stereo method for acquiring 3D topographies.
Figure 3:
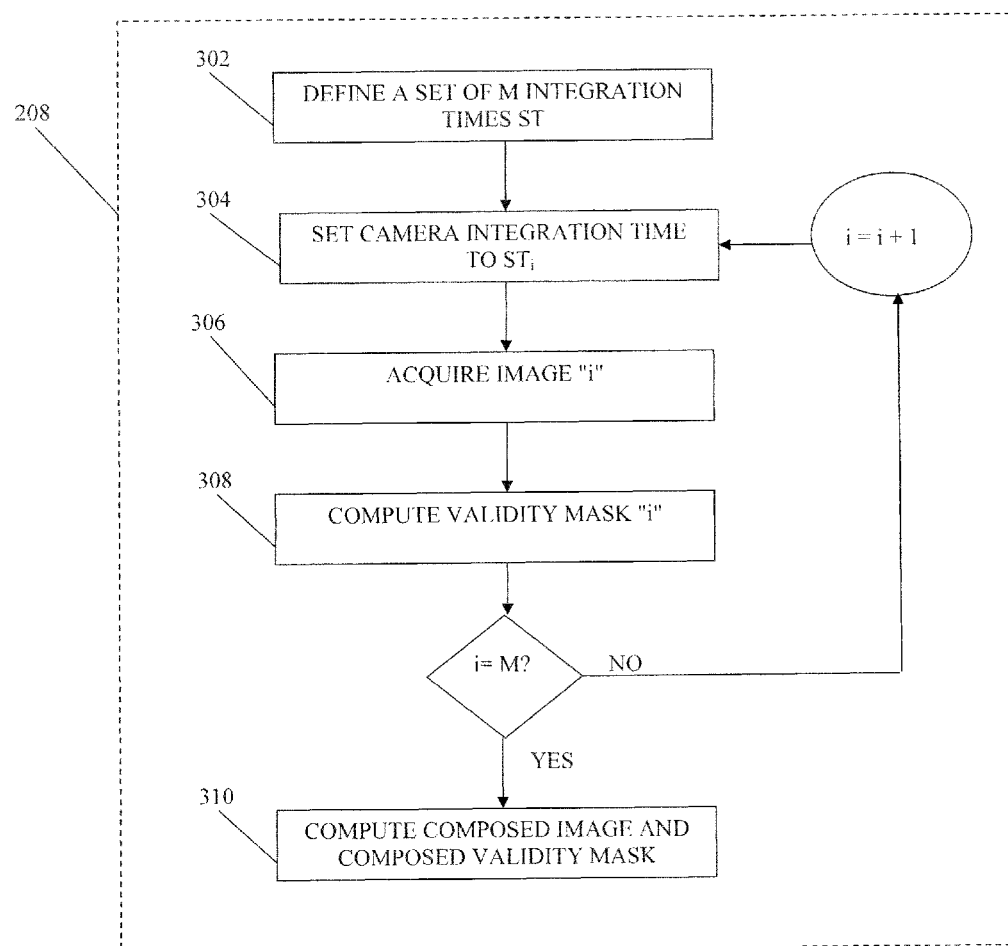
FIG. 3 is a flowchart illustrating an exemplary embodiment of a method for acquiring an image having multiple levels of gray.

FIG. 2 is a flowchart illustrating an exemplary method for determining a 3D topography $Z(x, y)$ of a region of an object. The first step of the method is a calibration step 202 using a reference plane, which will be explained in more detail below. The calibration involves determining the relative intensities of the light sources and their individual intensity pattern over the camera's Field of View (FOV). Once calibration is completed, the reference plane is replaced with the object 204. The set of K light sources are then illuminated successively 206, with at least one radiance image captured by the camera for each light source of the set 208. Once all images of the set are acquired, the surface normal field N(x,y) is computed by resolving, for every pixel of the FOV, the over defined set of equations 210:

$$I_i = A*\text{DiffuseTerm}(N, L_i) + B*\text{SpecularTerm}(N, L_i, C);$$

which results in NPX (number of pixels per row)*NPY (number of pixels per column) independent sets of non linear equations, where i goes from 1 to K, $L_i$ is the unit vector pointing from the surface to the ith light source and C is the unit vector pointing from the surface to the camera. The surface normal field N(x,y) is then integrated over the FOV to compute the topography Z(x,y) 212. The coefficients A and B are unknown and will be part of the results of the equation solution as well as the 3 components of N. In one embodiment, step 208 is performed sequentially to achieve higher bit depth images, as illustrated in the flowchart of FIG. 3. First a set of M camera integration times (or camera shutter speeds) is defined 302. These integration times should be sufficiently different in order to generate significantly different captured images. Depending on the bit depth of the images captured by the camera and the targeted bit depth of the resulting image, the number M of integration times could be as low as 2 and as high as 10, but a larger M is also possible. The camera is set to each integration time sequentially 304 and one image is captured and stored for every integration time 306. For every captured and stored image, a validity mask is computed and stored 308. A pixel is declared invalid if its intensity is outside the linear range of capture of the camera. Once the M images are captured and the M masks are computed, the resulting image, called the composed or composite or high dynamic range (HDR) image, is computed 310.

Figure 4:
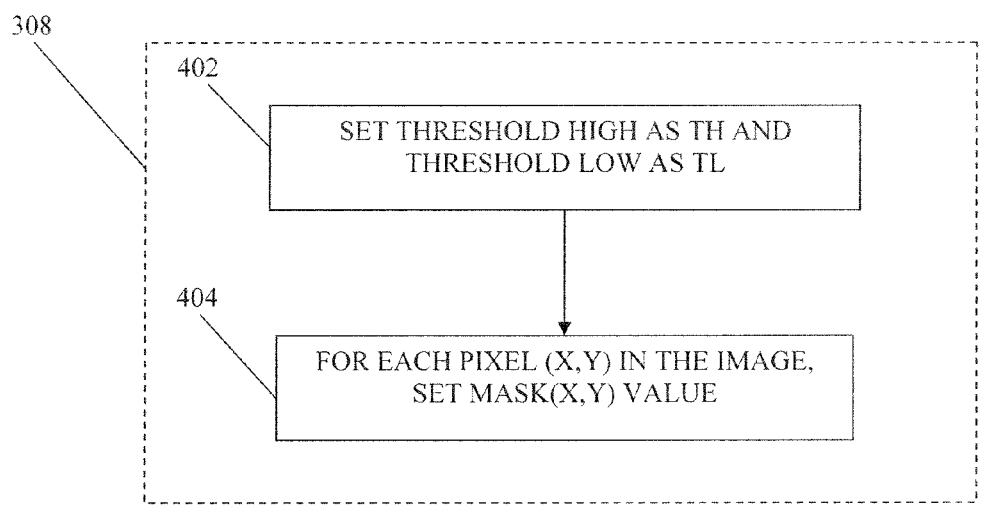
FIG. 4 is a flowchart illustrating an exemplary embodiment of a method for computing a validity mask.

FIG. 4 illustrates an exemplary method used to compute the validity mask 308 for each radiance image captured with a given integration time. A pair of intensity thresholds is first defined 402, one threshold for the high pixel intensity TH and one for the low pixel intensity TL. A pixel validity value of the accompanying validity mask for every image is computed as follows 404: the pixel value of the mask is set to 0 if the corresponding pixel intensity value in the image is greater than TH or below TL, and is set to 1 otherwise. Typical values for TL are usually very low and account for possible floor values in the images captured by the camera and/or expected dark current noise level of the camera. Values of TL can also be slightly higher to avoid shot noise dominated signal. Typical values for TH depend on the original bit depth of a single channel in the images captured by the camera. For the case of 8 bit images, the maximum gray level in the images is 255. The TH value is used to preserve the linearity condition between pixel intensity and integration time. It is thus set to a value below 255 to avoid pixel saturation, and high enough to keep a reasonable dynamic range.

Figure 5:
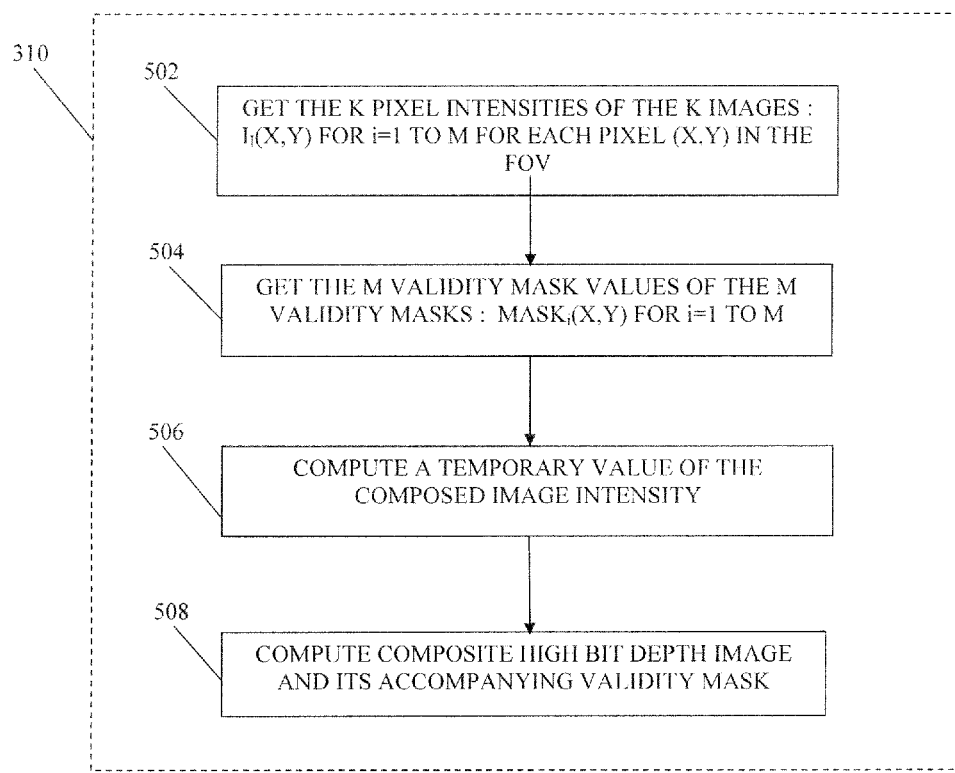
FIG. 5 is a flowchart illustrating an exemplary embodiment of a method for computing a composed image and a composed validity mask.

FIG. 5 illustrates an embodiment for computing the composed image and its accompanying composed image mask of validity 310. For each pixel position x, y we first get the set of M properly linearized pixel intensities $I_i(x,y)$ for each pixel (x,y) in the FOV 502 and the M validity mask values $\text{Mask}_i$ (x,y) 504. A temporary value of the composed image intensity is computed 506 with the following equation:

$$T(x, y) = \sum_{i=1}^{M} \text{Mask}_i(x, y) * I_i(x, y) * \frac{ST_M}{ST_i}$$

Where $ST_i$ is the $i^{th}$ integration time of the set and $ST_M$ is assumed to be the largest integration time of the set. Finally the composed high bit depth image and its accompanying mask of validity is computed 508 as follows:

If $$\sum_{i=1}^{M} \text{Mask}_i(x, y) > 0$$

then $$C(x, y) = \frac{T(x, y)}{\sum_{i=1}^{m} \text{Mask}_i(x, y)}$$

And

CMask(x,y)=1

Else

C(x,y)=0

And

CMask(x,y)=0, where C(x,y) is the composed image and CMask(x,y) is its accompanying mask of validity. Other methods of composing HDR images from a set of M images are known by those skilled in the art.

This definition of the composed image relies on the linearity of the recorded intensity with the exposure time. Similar results may be obtained by varying the light source intensity and/or the sensor's gain. However, the linearity condition is more difficult to achieve. If the parameters of construction of the composed image are set properly (number of camera integration times and their values) nearly every pixels of the composed image should be valid.

In an alternative embodiment, a digital monochrome camera with high bit depth capability can be used to deliver high bit depth images, which would constitute a convenient replacement for this procedure, and in some instances make it more rapid by lowering the number of camera integration times needed to obtain properly deep images.

Referring back to FIG. 2, once the set of K composed images $C_i(x,y)$ are obtained, along with possibly a set of K validity masks $\text{CMask}_i(x,y)$, the set of non-linear equations leading to the computation of the surface normal field N(x,y) can be solved 210. The generic formulation of the individual equation of the set is as follow:

$$I_i(x,y) = A(x,y) * \text{DiffuseTerm}_i + B(x,y) * \text{SpecularTerm}_i$$

The coefficients A and B are unknown and will be part of the results of the equation solution. $I_i(x,y)$ is the $i^{th}$ composed image of the set, or recorded intensity of the image or composed or recorded image corrected by the Calmap(x,y) value described below. The diffuse term is the regular Lambertian model of light reflection on diffusive material and is only dependent on the cosine of the angle between the surface normal and the direction of incoming light. It can be expressed in terms of a dot product, which reduces to:

$$\text{DiffuseTerm}_i(x,y) = N \cdot L = NxLx_i + NyLy_i + NzLz_i,$$

Where N·L indicates a dot product and $Lx_i$, $Ly_i$ and $Lz_i$ are the normalized Cartesian coordinates of the $i^{th}$ light source with the origin of the Cartesian system being in the center of the camera FOV. Nx, Ny and Nz are the Cartesian decompositions of the surface normal unit vector at position (x,y). Other formulations of the diffuse term are also possible.

The non linearity of the equation appears in the specular term, which can be written in different ways according to the model used for light reflection. In all cases however, the term depends on the angle between the local surface normal unit vector N and a unit vector $L_i$ which points in the direction of the $i^{th}$ light source. In the case of a perfectly specular surface, such as a mirror, the light emitted from light source i would reach the camera only if the angle between N and $L_i$ is such that the specular direction S points towards the camera, i.e. that the specular lobe is infinitely narrow. For really shiny material having a roughness parameter equal or larger than the light wavelength, the specular reflection occurs inside a lobe whose width depends on local surface characteristics.

In one embodiment, the non-linear term may be modeled using a Phong model. The Phong specular reflection model uses an analogy with the cosine function of the diffusive term and describes the specular lobe as a cosine of the angle between Si and C raised to the power α. The larger α is, the narrower the specular lobe is. The vector C points towards the camera and thus is equal to [0,0,1] in the present coordinate system, while the vector S is expressed in terms of N and L as:

$$S_i = 2(N \cdot L_j)N - L_j$$

Taking into account the above definition of C, the ith equation of the set then reads:

$$I_i(x,y) = A(x,y) * (NxLx_i + NyLy_i + NzLz_i) + B(x,y) * [2(Nx \cdot Lx_i + NyLy_i + NzLz_i)Nz - Lz_j]^\alpha$$

At this point the specular lobe width parameter α is unknown and will be given by the resolution of the equation set, as A, B and N.

In another embodiment, a Torrence and Sparrow model is used for the non-linear term (also known as Cook-Torrence model). Torrence and Sparrow proposed a model of light reflection on metallic surfaces. According to this model, each element of a metallic surface (or specular surface in general) is subdivided into a plurality of micro facets whose mean orientation correspond with the element's surface but are individually randomly normally distributed around this value. Mathematically, the specular lobe is described in terms of the dot product between N and a unit vector H which indicates the local surface normal that would lead to a specular reflection exactly towards the camera. Since the present coordinate system is centered in the center of the camera FOV with its Z axis pointing to the camera, and since the laws of physics dictate that this vector sits exactly between L and C (unit vector pointing to the camera), for a camera placed very far from the object's surface, this unit vector is:

$$H_i = [Lx_i, Ly_i, Lz_i + 1] / \|[Lx_i, Ly_i, Lz_i + 1]\|,$$

where the symbol ∥ ∥ indicates the norm operator. Since the camera is seated at [0,0,1], we can write:

$$I_i(x,y) = A(x,y) * (NxLx_i + NyLy_i + NzLz_i) + B(x,y) ** \text{Exp}[-[\text{ArcCos}(NxHx_i + NyHy_i + NzHz_i)]^2 / \sigma^2]$$

Exp is the exponential function, ArcCos is the inverse of the cosine function and σ is the width of the exponential function. The lower σ is, the narrower the specular lobe is. In principle, B(x,y) should also contain geometrical factors depending on incident and reflected angles that prevent the specular term from diverging. However, if we keep the inclination angle (the angle between the optical axis and the direction from the FOV center and the light source, also known as the zenith angle) of the $L_i$ unit vectors sufficiently far from π/2 (i.e., far from grazing incidence) these factors can be neglected. At this point, the specular lobe width parameter σ is unknown and will be given by the resolution of the equations set, as A, B and N.

In another embodiment, a Beckmann-Spizzichino model is used for the non-linear term. According to this model, the specular term is the sum of two contributions: a specular lobe, which may be described by a Torrence-Sparrow type model, and a specular spike, which describes the residual light energy that is reflected in a perfectly specular manner. The specular term can thus be rewritten as:

$$\text{SpecularTerm} = B1(x,y) * \text{SpecularLobe} + B2(x,y) * \text{SpecularSpike}$$

The specular spike term is formally written as δ(N, L), which is equal to 1 if N=H and 0 otherwise. However, since the sensor optics has a finite numerical aperture, the specular spike term can be written, for example, as a very narrow exponential function of N and H.

Other ways of modeling the light reflection of specular and/or diffusive surfaces will be known to those skilled in the art.

Figure 6:
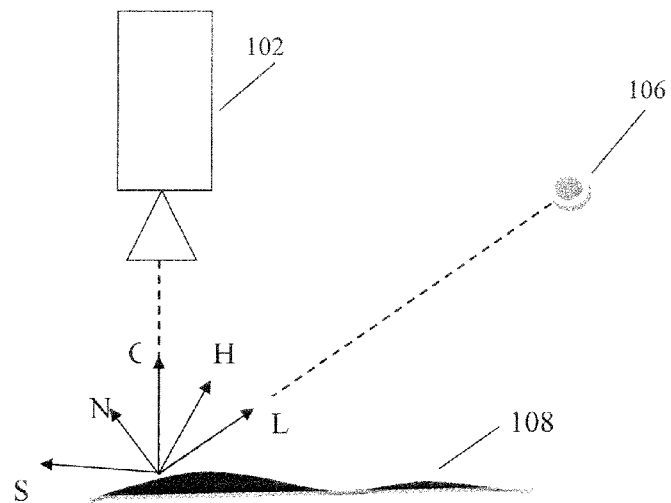
FIG. 6 is a schematic illustrating various vectors used for calculations in the non-linear photometric stereo method.

It is understood in the previously described models that the terms Nx, Ny, Nz all depend also on position (x,y) within the FOV. If the camera and/or the light sources are not placed very far from the object's surface, then the unit vectors $L_i$, $H_i$ and C might also depend on the positions (x,y) on the object's surface. The modifications to the above equations that those geometrical corrections introduce will be understood by those skilled in the art. FIG. 6 illustrates the position of each one of vectors N, C, S, H, and L.

The Phong and Torrence-Sparrow models contain up to five free parameters (the three Cartesian coordinates of the surface normal N [with the added constraint that N is normalized], the two coefficients A and B and the width of the specular lobe) and the Beckmann-Spizzichino models adds at least two more parameters to account for the specular spike. Provided the number K of light sources, and thus the number of equations in the set to solve, is high enough, one can choose to solve for all of these parameters. Alternatively, it is possible to measure the reflectivity function of the material of the object under study and fix the coefficients and/or lobe width and/or spike width values in the equations and solve for a reduced set of free parameters. These parameter values can also be fixed by other means than actual measurements.

Step 202 of FIG. 2 refers to a calibration of a reference plane. This is done in order to calibrate the light sources. Three objectives of this step are: to obtain a relative intensity calibration between light sources having a same inclination angle, to obtain a relative intensity calibration between light sources having different inclination angles, and to obtain a relative intensity calibration between the pixels in the FOV shined by a particular light source.

In one embodiment, calibration may be done as follows. First, a flat calibration surface is placed in the FOV of the camera and at the focal distance of the optical sensor. The K light sources are shone in a sequential manner and at least one radiance image is acquired from every light source. The dark current and/or floor value contribution from the images is removed from every image. One possible way to perform this step consists in acquiring an image in absence of light and removing this image from every image of the set of K images. Each resulting image is then divided by the cosine of the inclination angle of the light source associated with the image (this ensures that the light sources from different levels are calibrated, provided the calibration surface is Lambertian) and the resulting images $C_i(x,y)$ are recorded. Alternatively, other surfaces with known reflection functions can be used with the appropriate correction for the inclination angle of the light source. For every image of the set of K resulting images, the mean of the pixel values is recorded. Furthermore, divide these mean values by the highest value of the set and record this set of normalized means as $MeanN_i$. The set of K calibration maps are defined as:

$$CalMap_i(x,y) = MeanN_i/C_i(x,y)$$

Instead of using the mean pixel value of every calibration image, one can consider the maximum or median values or other characteristic values of these images and end up with a set of normalized maximums or medians or other characteristics to compute the term $CalMap_i(x,y)$.

If no calibration images are recorded, then the calibration maps are set to "1" for every pixel. When working with calibrated images, in all preceding (or following) equations, one should replace the recorded pixel intensity $I_i(x,y)$ with:

$$IC_i(x,y) = I_i(x,y) \times CalMap_i(x,y)$$

In the second step of the calibration procedure, the captured images are divided by the cosine of the inclination angle of the light source, suggesting that the calibration surface is Lambertian at least for the set of inclination angles used. Alternatively, a surface with a different but known reflection function could be used with the correct divider. Another possible step might be to ensure by another method or apparatus that all K light sources have equal intensities, or different but known intensities. In that case, only the last step of the aforementioned procedure needs to be performed, and the equation in use is:

$$CalMap_i(x,y) = Mean_i/C_i(x,y)$$

$Mean_i$ is the mean value of the $i^{th}$ calibration image. However this step is optional in the case where the light sources are sufficiently far from the surface so that one can consider that they generate a constant light pattern one the surface.

Figure 7:
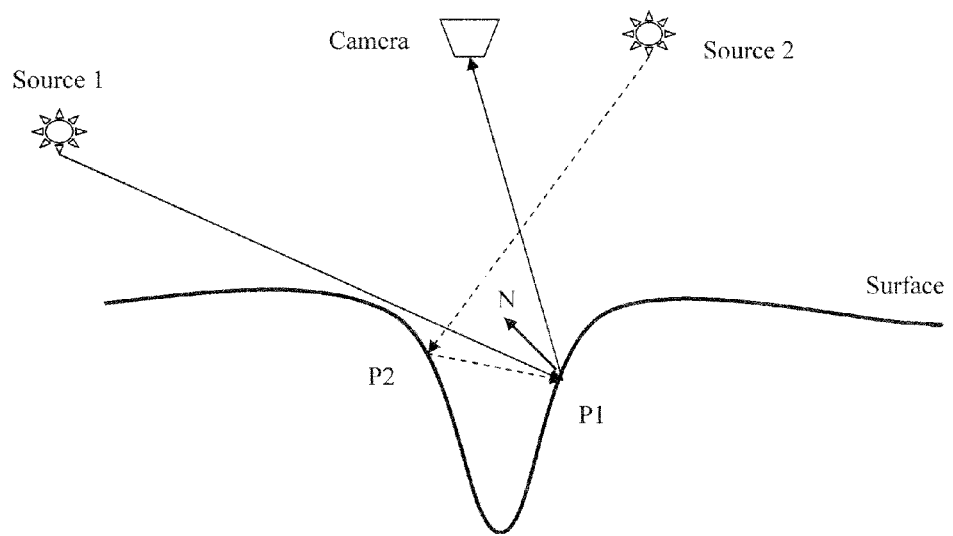
FIG. 7 is a schematic illustrating multiple-step reflections.

As illustrated in FIG. 6, the mathematical description of light reflection on the object's surface towards the camera implicitly assumes a single-step reflection. However, considering the high reflectivity of specular materials and the inherent convex shape of a spent cartridge case primer region, multiple-step reflections on the object surface may transfer light intensity from a source to the camera. This is illustrated in FIG. 7. A specular surface is successively shone from source 1 and source 2 and the result is observed with a camera. A high intensity is expected on the camera pixel corresponding to the surface point P1 when Source 1 is shone because the local surface orientation reflects light from Source 1 inside a specular lobe pointing in the general direction of the camera. When Source 2 is shone, we should not expect to record any light on the camera pixel corresponding to point P1 since light should be reflected away from the camera at this point. However, light reaching point P2 from Source 2 is reflected toward point P1 with an angle of incidence near the optimal specular angle, resulting in a significant intensity recorded on the camera pixel corresponding to point P1.

When resolving the local surface normal vector for point P1 with intensity collected from Source 1 and Source 2, the fitting algorithm will likely try to satisfy incompatible information because its physical model does not consider multiple reflections. This usually results in an underestimation of the local slope of the surface. Note that the scale of the surface shown in FIG. 7 is relatively arbitrary. The effect described will occur as long as the geometrical optics model holds, that is if the scale of the depression is larger than a few microns for visible light. For smaller details, multiple reflections can still occur, but will need a much more complicated description involving the wave nature of light. Therefore, multiple reflections may generally occur for tool marks and ballistic marks lying on specular materials.

There is no easy way to solve this issue because it turns an originally local mathematical description into a global description which complicates the numerical resolution to a level which is not practical. Such a problem is usually resolved iteratively since some a priori knowledge of the surface shape is needed to estimate multiple reflection contributions, but owing to the non linear nature of the problem, convergence is not guaranteed.

The approach proposed herein consists in removing the contribution from a source for a particular pixel if we believe that the recorded intensity for this source at this location is significantly corrupted due to multiple reflections. The identification of the multiple-reflection induced corrupted intensity is supported by the notion that the function describing the reflection process is azimuthally monotonic. In other words, if we consider a group of light sources that all show roughly the same inclination angle with respect to the optical axis of the system, but are more or less uniformly distributed around this axis (that is they have different azimuth angles), a curve of the recorded intensity versus the azimuth angle of the source should show a single maximum, and this maximum occurs for the source that is the closest to the plane defined by the optical axis and the local normal N of the surface.

In practice, one would analyze the set of recorded intensities for a particular pixel in the following way. First regroup the intensities in subsets with comparable inclination angles of the light sources relative to the optical axis and order the intensities according to the azimuth angles of the sources. For a particular subset, if the intensities vs. azimuth angle curve shows only one maximum, then all the intensities are kept for the fitting procedure. Inversely, if many maxima are found, the most probable best maximum is identified. This may be done by comparing the position and shape of the maxima with those found on other subsets of intensities. The best maximum should repeat more uniformly for all inclination angle subsets. Once the right maximum is found, all intensities associated with the other maxima are removed from the data set that will be fitted.

Similarly, the reflection function is also monotonic with respect to the inclination angle for a given azimuth angle, and is maximum when the angle between N and the optical axis is half the angle of L (the light source direction) and the optical axis. However, for low value of inclination angles (i.e. for sources placed near the optical axis), the azimuth angle is of less significance. Also, since the reflection function is non linear and varies rapidly with L for a given N, it not possible in a single reflection scheme to record high intensities from both the low inclination angle subsets and the high inclination angle subsets. Thus, a second criterion is used for sources of lower inclination angle subsets (i.e. roughly below 15 degrees). If the maximum value recorded for a given pixel from the highest inclination angle subset exceeds k times the maximum value from the lowest inclination angle subset, all intensities from the lowest inclination angle are removed from the data set to be fitted. The value of k is typically below 1 and its exact best value depends on the inclination angle difference between the two subsets.

The two techniques described above to address multiple-step reflections are usually run for every pixel of the camera FOV prior to the non-linear fitting procedure. Other methods to identify multiple-reflection dominated recorded intensities can be used, as will be recognized by those skilled in the art.

Figure 8:
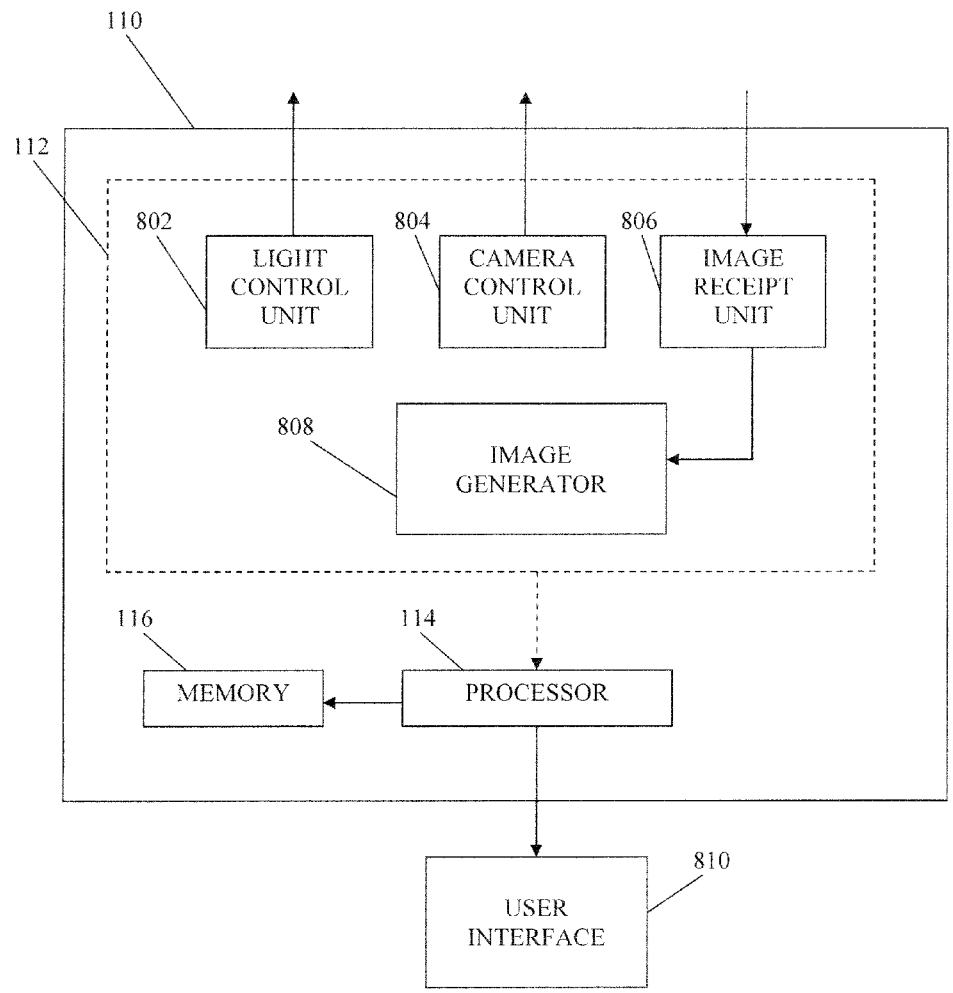
FIG. 8 is block diagram of an exemplary embodiment for the computer system of FIG. 1.

FIG. 8 is a block diagram of an exemplary embodiment for the application 112 running on the processor 114 of the computer system 110 of FIG. 1. A light control unit 802 controls the light sources 106 such that they illuminate sequentially, one at a time. A camera control unit 804 controls the sensor 102 in order to acquire the images at appropriate times and in accordance with the integration times previously determined, as explained above. Each acquired image is received at the image receipt unit 806 and transferred to the image generator 808.

The image generator 808 uses the acquired images to solve a set of non-linear equations comprising a diffuse term and a specular term in order to obtain the 3D topography Z(x,y). As described above, this is done by solving, for every pixel of the K images, an over defined set of K equations linking a captured or calibrated radiance $I_i$ of an $i^{th}$ image with a sum of the diffusive term and the specular term which depends on a local surface normal, a lighting direction and/or a viewing direction. A map of the calculated surface unit normal N is integrated in order to obtain the surface topography Z(x, y). A user interface 810 is connected to the processor 114. The user interface may comprise a keyboard, a display, and any other known user interface components used for interacting with a computer system. For example, a display may be used for input and output, if the screen is a touch screen. Various other embodiments will be readily understood by those skilled in the art.

A memory 116 may be provided and be accessible by the processor 114 to receive and store data. The memory may be a main memory, such as a high speed Random Access Memory (RAM), or an auxiliary storage unit, such as a hard disk, a floppy disk, or a magnetic tape drive. The memory may be any other type of computer readable medium, such as a Read-Only Memory (ROM), or optical storage media such as a videodisc and a compact disc. Note that the memory 116 may be external to the computer system 110.

The processor 114 may access the memory 116 to retrieve data. The processor 114 may be any device that can perform operations on data. Examples are a central processing unit (CPU), a front-end processor, a microprocessor, a graphics processing unit (GPU/VPU), a physics processing unit (PPU), a digital signal processor, and a network processor. An application may be coupled to the processor 114 and configured to perform various tasks as explained above in more detail. It should be understood that the modules illustrated in FIG. 8 may be provided in a single application or a combination of two or more applications coupled to the processor 114.

In some embodiments, the processor 114 is configured to control the sensor to acquire at least one image with each one of the defined integration times while a light source is on and shines with constant intensity. For each pixel of every image of the set, the image generator 808 will determine if this pixel is valid if its recorded intensity is below a predefined threshold. For each pixel position of the FOV, the image generator 808 will add the intensity values of the valid pixel of the set multiplied by the inverse of its integration time and divide the result by the number of valid pixels at this position, to obtain a composed bit depth augmented image.

Figure 9:
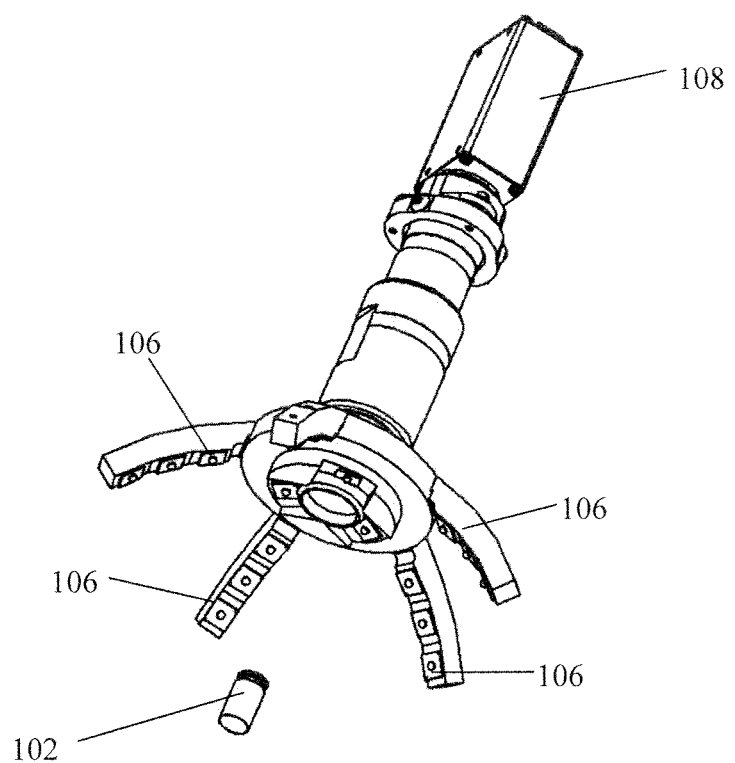
FIG. 9 is schematic illustrating an exemplary embodiment for a multi-elevation level set of light sources.

In some embodiments, the set of K light sources are subdivided into J subsets, each of these subsets being characterized by a defined inclination angle. J may be two or greater than two. FIG. 9 illustrates one exemplary embodiment for the light sources.

In some embodiments, the K effective light sources are obtained from Q physical light sources and a series of P rotations of the object under study around the optical axis of the sensor. The methods to realign the captured images with the set of images not rotated are known to those skilled in the art. The rotations may be applied to the whole sensor or to the light set only without affecting the generality of the method. If only the light set is rotated, then all of the K effective light sources need a calibration map. If the object is rotated (or the sensor together with the light source set), then only the Q physical light sources need a calibration map but it should be applied to the image prior to the realignment procedure.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

It should be noted that the present invention can be carried out as a method, can be embodied in a system, a computer readable medium or an electrical or electro-magnetic signal. The embodiments of the invention described above are intended to be exemplary only. The scope of the invention is therefore intended to be limited solely by the scope of the appended claims.

The invention claimed is:

1. A method for determining a 3D topography Z(x,y) of a surface of an object, the method comprising:
    successively illuminating the surface of the object from a plurality of localized axis positions, the object having a specular reflection dominant over a diffuse reflection;
    acquiring at least one image of the surface of the object at each successive illumination of the surface of the object using a sensor having a sensing axis substantially perpendicular to a general plane of the surface of the object, thereby resulting in a set of radiance images having a same field of view (FOV);
    for each radiance image of the set, defining a measured radiance at position (x, y) on an image i as a sum of a diffuse reflection term and a specular reflection term dependent on a surface normal vector field N(x, y), a light source direction $L_i$ and a camera direction C, to obtain a set of non-linear equations;
    solving the set of nonlinear equations for at least the specular reflection term to find the surface normal vector field N(x,y); and
    integrating the surface normal vector field N(x, y) over the FOV to determine the 3D topography Z(x,y).

2. The method of claim 1, further comprising calibrating a reference plane and replacing the reference plane with the object before successively illuminating the surface of the object.

3. The method of claim 2, wherein calibrating the reference plane comprises:
    placing a reference surface in a field of view of the sensor at a focal distance thereof;
    successively illuminating the reference surface from the plurality of localized axis directions;

acquiring at least one calibration radiance image at each successive illumination;

computing a set of characteristic values for the calibration radiance images;

determining a maximum characteristic value;

normalizing the set of characteristic values by the maximum value to get a set of normalized characteristics $M_i$; and obtaining a set of calibration maps from an inverse of the calibration images divided by the normalized characteristics $M_i$; wherein calibrated images for source i are obtained by multiplying a captured image with an ith calibration map.

4. The method of the claim 1, further comprising using the surface normal vector field N(x,y) to view the object with a rendering engine.

5. The method of claim 1, wherein successively illuminating the surface of the object comprises using Q physical light sources and a series of P rotations of the object or of the physical light sources, around the sensing axis of the sensor, to obtain the K localized axis directions, K>Q.

6. The method of claim 1, wherein acquiring at least one image comprises:

defining a set of M different camera integration times;

acquiring one image with each one of the defined integration times, thereby acquiring M images;

computing a validity mask for each one image; and computing a composite image having a higher bit depth than the image acquired, and computing a composite validity mask, using the one image acquired with each one of the integration times and corresponding validity masks.

7. The method of claim 6, wherein computing the validity mask for each one image comprises:

setting a high intensity threshold TH and setting a low intensity threshold TL; and setting a mask(x,y) value for each pixel in the one image as a function of TH and TL.

8. The method of claim 6, wherein computing the composite image and the composite validity mask comprises:

obtaining a set of M pixel intensities $I_i(x,y)$ from the M images;

obtaining M validity mask values $Mask_i(x,y)$ from the validity mask for each image;

computing a temporary value for a composite image intensity; and computing a composite high bit depth image and an accompanying composite validity mask.

9. The method of claim 1, further comprising removing equations from the set of nonlinear equations where the measured radiance is affected by multiple-step reflections on the surface of the object.

10. A system for determining a 3D topography Z(x,y) of a surface of an object, the system comprising:

a sensor for acquiring 2D radiance images, the sensor having a sensing axis substantially perpendicular to an overall plane of the object, the object having a specular reflection dominant over a diffuse reflection;

a set of K effective light sources provided at a plurality of localized axis directions; and a computer readable medium having program code stored thereon and executable by a processor for:

causing the K effective light sources to successively illuminate the surface of the object from the plurality of localized axis directions;

causing the sensor to acquire at least one image of the surface of the object at each successive illumination of the surface of the object, thereby resulting in a set of radiance images having a same field of view (FOV);

for each radiance image of the set, defining a measured radiance at position (x, y) on an image i as a sum of a diffuse reflection term and a specular reflection term dependent on a surface normal vector field N(x, y), a light source direction $L_i$ and a camera direction C, to obtain a set of non-linear equations;

solving the set of nonlinear equations for at least the specular reflection term to find the surface normal vector field N(x,y); and integrating the surface normal vector field N(x, y) over the FOV to determine the 3D topography Z(x,y).

11. The system of claim 10, wherein the computer readable medium further comprises program code executable by a processor for calibrating a reference plane.

12. The system of claim 11, wherein the program code for calibrating the reference plane comprises program code for:

causing the K effective light sources to successively illuminate a reference surface from the plurality of localized axis directions;

causing the sensor to acquire at least one calibration radiance image at each successive illumination;

computing a set of characteristic values for the calibration radiance images;

determining a maximum characteristic value;

normalizing the set of characteristic values by the maximum value to get a set of normalized characteristics $M_i$; and obtaining a set of calibration maps from an inverse of the calibration images divided by the normalized characteristics $M_i$; wherein calibrated images for source i are obtained by multiplying a captured image with an ith calibration map.

13. The system of claim 10, wherein the K effective light sources comprise Q physical light sources rotatable to positions corresponding to the plurality of localized axis directions.

14. The system of claim 10, further comprising a stand for rotating the object to a plurality of localized axis directions in order to correspond to the plurality of localized axis directions for the K effective light sources.

15. The system of claim 10, wherein the K effective light sources are provided in a plurality of subsets having different inclination angles.

16. The system of claim 10, wherein the program code for solving the set of nonlinear equations also comprises program code to remove equations from the set of non-linear equations where the measured radiance is affected by multiple-step reflections on the surface of the object.

17. A non-transitory computer readable medium having encoded thereon:

program code of a light control module executable by a processor to cause K effective light sources to successively illuminate a surface of an object from a plurality of localized axis directions, the object having a specular reflection dominant over a diffuse reflection;

program code of a sensor control module executable by a processor to cause a sensor to acquire at least one image of the surface of the object at each successive illumination of the surface for the object, thereby resulting in a set of radiance images having a same field of view (FOV); and program code of a topography generating module executable by a processor to define, for each radiance image of the set, a measured radiance at position (x, y) on an image i as a sum of a diffuse reflection term and a specular reflection term dependent on a surface normal vector field N(x, y), light source direction $L_i$ and a camera direction C, to obtain a set of non-linear equations; solve the set of nonlinear equations for at least the specular reflection term to find the surface normal vector field N(x,y); and integrate the surface normal vector field N(x, y) over the FOV to determine the 3D topography Z(x,y).

18. The non-transitory computer readable medium of claim 17, wherein the program code of the topography generating module further comprises program code to remove equations from the set of non-linear equations where the measured radiance is affected by multiple-step reflections on the surface of the object.

* * * * *